Patented Oct. 9, 1928.

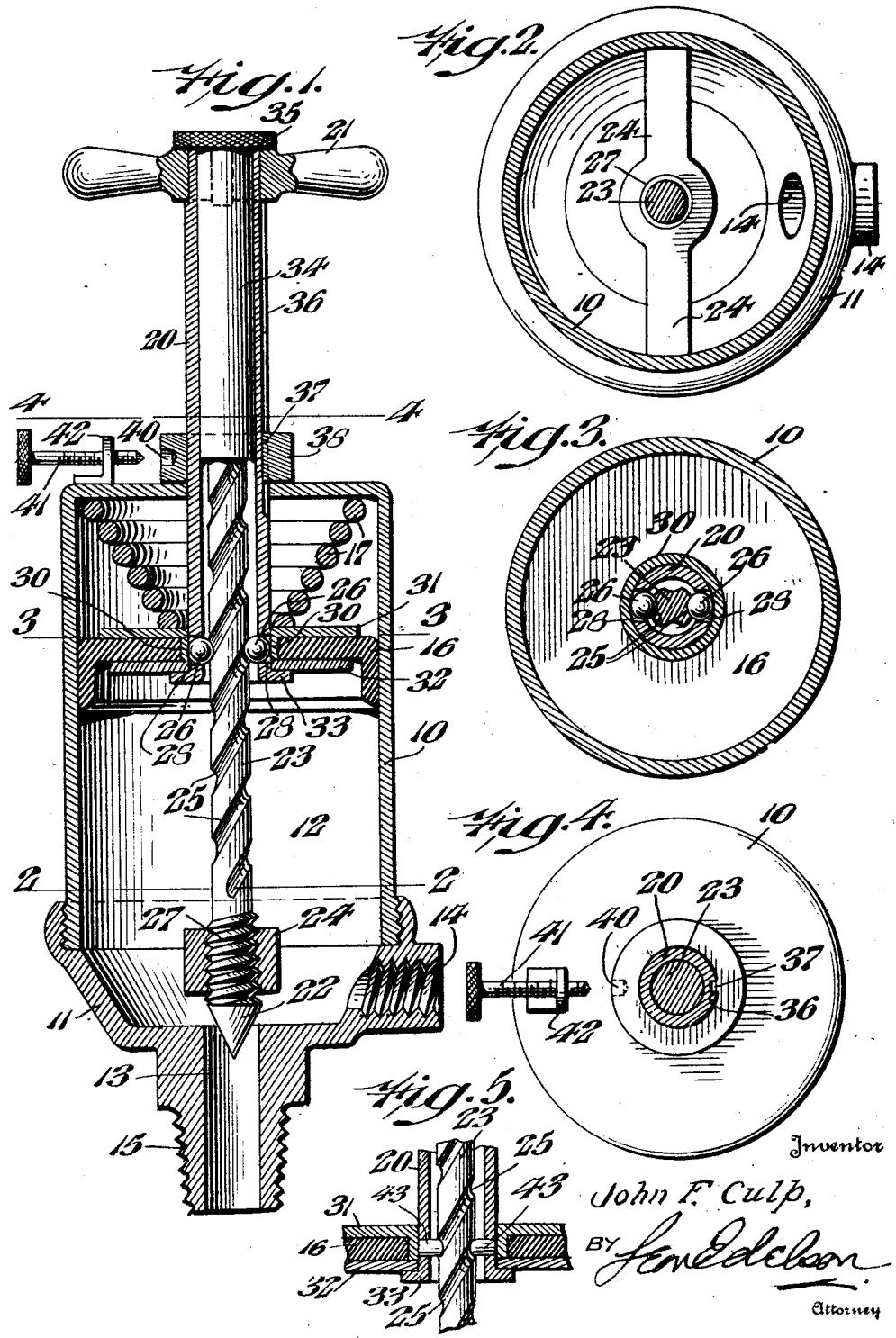

1,686,801

UNITED STATES PATENT OFFICE.

JOHN F. CULP, OF PHILADELPHIA, PENNSYLVANIA, ASSIGNOR TO IDEAL LUBRICATOR COMPANY, OF PHILADELPHIA, PENNSYLVANIA, A CORPORATION OF DELAWARE.

GREASE CUP.

Application filed February 5, 1927. Serial No. 166,239.

The present invention relates to grease cups, and more particularly to an improved grease feeding means for proportioning the flow of grease to give a substantially constant quantity feed.

Some of the objects of the present invention are to provide an improved grease feeding means for grease cups; to provide an automatic grease flow proportioning device for grease cups; to provide a control valve for grease cups which is entirely closed during filling operations and is automatically opened for feeding purposes; to provide means for gradually opening a discharge valve of a grease cup to vary the quantity discharged in accordance with the pressure of the grease expelling means; to provide a needle valve controlling mechanism for grease cups; and to provide other improvements as will hereinafter appear.

In the accompanying drawings Fig. 1 represents a sectional elevation of a grease cup embodying one form of the present invention; Fig. 2 represents a section on line 2—2 of Fig. 1; Fig. 3 represents a section on line 3—3 of Fig. 1; Fig. 4 represents a section on line 4—4 of Fig. 1; and Fig. 5 represents a detail of a modified form of the invention.

Referring to the drawings, one form of the present invention is shown as applied by way of example to a grease cup of the type having a cup body 10 and nozzle discharge member 11 joined by threaded connection to provide a grease reservoir 12 with a discharge outlet 13. The member 11 is provided with a tapped inlet 14 for attachment of a suitable fitting for filling purposes under pressure, and a threaded part 15 for mounting the cup upon the part to be lubricated.

For expelling the stored grease, a plunger 16 is slidably mounted within the cup 10 and receives its ejecting movement under the influence of a spiral coil spring 17. As here shown, the plunger 16 is centrally connected to a tubular stem 20 which projects through the closed end of the cup 10 and carries a handle 21 by which it can be manually manipulated when desired.

In order to control the discharge of grease by way of the outlet 13, a needle valve 22 is provided which is arranged to entirely close the inlet to the passage 13 when the cup is being filled. This needle valve 22 is formed on the end of a shank 23 and is threaded through a fixed cross bar 24 preferably cast integral with the member 11, the essential point being that the bar 24 is fixed regardless of how it is secured within the chamber 12.

In order to cause the shank 23 to turn in a direction to back off the needle valve 22 from its seat on the member 11, the shank 23 is provided with a spiral groove 25 which receives two balls 26, the arrangement being such that when the balls 26 travel linearly toward the outlet 13, they will transmit a turning movement to the shank 23 and thus cause the thread 27 to feed the needle valve away from the outlet 13. The balls 26 are respectively held in a cage formed by holes 28 in opposite sides of the stem 20 and are prevented from displacement by a bushing 30 which is a part of one of the piston clamping collars 31 and 32. The end of the stem 20 has a peripheral flange 33 against which the central part of the piston 16 is held by the spring 17. The shank 23 extends upwardly within the stem 20 and has a body 34 to which a cap 35 is attached and holds the handle 21 in place.

In order to permit free sliding movement of the stem 20 through the end of the cup 10 while preventing turning of the stem 20, a groove 36 is cut in the side of the stem 20 parallel to its axis and seats a tongue 37 formed internally of a collar 38. At a convenient place on the collar 38 there is a hole 40 located in the path of a thumb screw 41 which has threaded engagement with an angle lug 42. Under automatic operating conditions the screw 41 is in locking engagement with the hole 40 and thus prevents the collar 38 from turning and thereby holds the stem 20 against the torque transmitted through the balls 26 and spiral groove 25. When the piston 16 is to be controlled manually the screw 41 is removed from the hole 40 and so allows the stem 20 to be turned by the handle 21.

In operation the needle valve 22 is brought down to close the outlet 13 and grease is introduced through the filling port 14 under pressure to cause the piston 16 to move up and place the spring 17 under compression. During this filling the lock screw 41 is out of the hole 40 and consequently the balls 26 merely cause the stem 20 to turn without effecting any change in the position of the needle valve 22. When the cup is filled the screw 41 is brought into the hole 40 to lock the collar 38 and stem 20 against rotation. With the needle valve 22 is turned to give a minimum opening to the outlet 13 the piston under its spring pressure causes the grease to feed out of the chamber 12 and the quantity fed bears a direct ratio to the maximum spring pressure. As the pinion 16 is gradually forced down to eject the grease the balls 26 act against the spiral 25 and cause the shank 23 to turn. This rotary movement of the shank 23 is transmitted to the needle valve thread 27 and because of the fixed bar 24 feeds the valve 22 gradually away from the outlet 13 but at a rate predeterminedly proportioned to maintain substantially the same quantity of grease flow in a given time.

In the form of the invention shown in Fig. 5, another means is provided, in place of the balls 26, to transmit movement of the stem 20 to the shank 23, such consisting of a pair of oppositely disposed pins 43 fixed to the stem 20 and projecting respectively into the spiral groove 25. In this construction, the movement of the stem 20 causes the pins 43 to ride in the groove 25 and since the pins 43 are held against turning movement their action will be to rotate the shank 23 and thereby feed the needle valve 22 away from its seat on the outlet 13.

It will now be apparent that a complete unitary grease feeding means has been devised wherein the grease is always under positive control both as to feeding pressure and as to quantity fed. Also when the feeding pressure is approaching its minimum, the outlet for grease will be gradually approaching its maximum, and in consequence the bearing to be lubricated will receive the required amount of grease regardless of the decrease in the operating pressure upon the grease. Furthermore, there is no waste and no flooding of the bearing when refilling the cup because the outlet 13 is entirely closed.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. The combination of a grease cup having a discharge outlet, an internally threaded member fixed in said cup, a needle valve threaded through said member and arranged to control said outlet, a spring pressed plunger for discharging grease through said outlet, and means operated by said plunger for turning said valve in said fixed member to gradually open said outlet.

2. The combination of a grease cup having a discharge outlet, an internally threaded member fixed in said cup, a needle valve threaded through said fixed member and arranged to control said outlet, a shank attached to said needle valve and having a spiral groove therein, a spring pressed plunger for discharging grease from said cup by way of said outlet, a tubular member encircling said shank, ball members carried by said tubular member and riding in said groove, and means to prevent rotation of said tubular stem.

3. The combination of a grease cup having a discharge outlet, a valve threaded to move to open and close said outlet, a spring pressed plunger for discharging grease from said cup by way of said outlet, and means rotated by said plunger for proportioning the opening of said valve in accordance with the pressure on said spring pressed plunger.

4. The combination of a grease cup having a discharge outlet, a valve threaded to move to open and close said outlet, a spring pressed plunger for discharging grease from said cup by way of said outlet, and means including a rotatable part controlled by said plunger for providing a minimum opening of said valve when the force of said spring pressed plunger is a maximum and a maximum opening of said valve when the force of said spring pressed plunger is a minimum.

5. The combination of a grease cup having a discharge outlet, a needle valve controlling said outlet, a spring pressed piston for discharging grease from said cup, a shank for said needle valve having a spiral groove therein, a pin riding in said groove and fixed to said piston but held against rotation, and means to feed said needle valve to vary said outlet as said shank is turned.

Signed at Philadelphia, county of Philadelphia, State of Pennsylvania, this 25th day of January, 1927.

JOHN F. CULP.